US010428265B2

(12) United States Patent
Nguyen et al.

(10) Patent No.: US 10,428,265 B2
(45) Date of Patent: Oct. 1, 2019

(54) SELECTIVE ACIDIZING OF A SUBTERRANEAN FORMATION

(71) Applicant: Halliburton Energy Services, Inc., Houston, TX (US)

(72) Inventors: Philip D. Nguyen, Houston, TX (US); Loan K. Vo, Houston, TX (US); Jessica L. Heeter, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/116,741

(22) PCT Filed: May 7, 2014

(86) PCT No.: PCT/US2014/037184
§ 371 (c)(1),
(2) Date: Aug. 4, 2016

(87) PCT Pub. No.: WO2015/171140
PCT Pub. Date: Nov. 12, 2015

(65) Prior Publication Data
US 2017/0218261 A1 Aug. 3, 2017

(51) Int. Cl.
*E21B 43/26* (2006.01)
*C09K 8/72* (2006.01)
(Continued)

(52) U.S. Cl.
CPC ............... *C09K 8/72* (2013.01); *C09K 8/805* (2013.01); *E21B 33/138* (2013.01); *E21B 43/25* (2013.01);
(Continued)

(58) Field of Classification Search
CPC ...... C09K 8/72; C09K 8/805; C09K 2208/24; C09K 2208/26; E21B 43/25; E21B 43/267; E21B 43/26
(Continued)

(56) References Cited

U.S. PATENT DOCUMENTS 5,238,067 A   8/1993  Jennings, Jr.
6,207,620 B1  3/2001  Gonzalez et al.
(Continued)

FOREIGN PATENT DOCUMENTS

WO  WO-2015171140 A1  11/2015

OTHER PUBLICATIONS

"International Application Serial No. PCT/US2014/037184, International Search Report dated Feb. 6, 2015", 4 pgs.
(Continued)

*Primary Examiner* — Silvana C Runyan
(74) *Attorney, Agent, or Firm* — Chamberlain Hrdlicka

(57) ABSTRACT

Various embodiments disclosed relate to methods of acidizing subterranean formations and systems for performing the method. In various embodiments, the present invention provides a method of acidizing a subterranean formation including placing an acid-resisting treatment composition including a surface modification agent in a subterranean formation, such that part of the subterranean formation includes an at least partially acid-resistant coating including the acid-resisting treatment composition or a reaction product thereof. The method also includes placing an acidizing composition in the subterranean formation, wherein the acidizing composition at least one of etches and dissolves a part of the subterranean formation substantially free of the acid-resistant coating.

19 Claims, 2 Drawing Sheets

(51) Int. Cl.
*C09K 8/80* (2006.01)
*E21B 33/138* (2006.01)
*E21B 43/25* (2006.01)
*E21B 43/267* (2006.01)

(52) U.S. Cl.
CPC ............ *E21B 43/26* (2013.01); *E21B 43/267* (2013.01); *C09K 2208/08* (2013.01); *C09K 2208/24* (2013.01); *C09K 2208/26* (2013.01); *C09K 2208/32* (2013.01)

(58) Field of Classification Search
USPC ..................................................... 166/280.1
See application file for complete search history.

(56) References Cited

U.S. PATENT DOCUMENTS

| | | |
|---|---|---|
| 7,004,255 B2 | 2/2006 | Boney |
| 7,148,184 B2 | 12/2006 | Francini et al. |
| 7,166,560 B2 | 1/2007 | Still et al. |
| 7,431,089 B1 | 10/2008 | Couillet et al. |
| 7,819,192 B2 | 10/2010 | Weaver et al. |
| 8,196,662 B2 | 6/2012 | Plasier et al. |
| 8,505,628 B2 * | 8/2013 | Panga ................ C09K 8/80 166/278 |
| 9,296,943 B2 * | 3/2016 | Ladva ................ C09K 8/68 |
| 2006/0113077 A1 * | 6/2006 | Willberg ............. C09K 8/42 166/280.1 |
| 2007/0039733 A1 | 2/2007 | Welton et al. |
| 2007/0114030 A1 | 5/2007 | Todd et al. |
| 2007/0131422 A1 | 6/2007 | Gatlin et al. |
| 2013/0161003 A1 * | 6/2013 | Makarychev-Mikhailov ............ C09K 8/685 166/280.1 |
| 2013/0192839 A1 | 8/2013 | Brown et al. |
| 2014/0345870 A1 * | 11/2014 | Vo ..................... E21B 43/26 166/308.3 |
| 2016/0053160 A1 * | 2/2016 | Nguyen ............... C09K 8/68 166/308.5 |
| 2016/0272869 A1 * | 9/2016 | Singh ................. C09K 8/12 |
| 2016/0304770 A1 * | 10/2016 | Nguyen ............... C09K 8/66 |

OTHER PUBLICATIONS

"International Application Serial No. PCT/US2014/037184, Written Opinion dated Feb. 6, 2015", 16 pgs.
Vo, L. K., et al., "Development and Applications of an Aqueous-Based Surface Modification Agent", SPE 165172, (2013), 1-10.

* cited by examiner

SELECTIVE ACIDIZING OF A SUBTERRANEAN FORMATION

PRIORITY APPLICATIONS

This application is a U.S. National Stage Filing under 35 U.S.C. 371 from International Application No. PCT/US2014/037184, filed on 7 May 2014, and published as WO 2015/171140 on 12 Nov. 2015, which application and publication is incorporated herein by reference in its entirety.

BACKGROUND OF THE INVENTION

Acid fracturing is a widely used technique for increasing the production of oil from a well that penetrates an underground hydrocarbon bearing formation. Typically during an acid fracturing treatment, a pad fluid is injected into the formation so as to create a buildup in wellbore pressure sufficient to overcome compressive stresses and tensile strength of the rock formation. When subjected to a sufficient pressure, the rock fails, allowing a crack, also referred to as a fracture, to form in the formation. Continued fluid injection often increases the fracture's length, height, and width. Acid is then injected into the fracture and the acid chemically reacts with the face of the fracture, etching the face so that when the fracture closes, flow channels are created that extend deep into the formation.

Acid tends to dissolve or etch the first material it encounters, dissolving large pockets of material, which leads to unsupported flow channels that are concentrated near the wellbore, near high permeability areas, or near a region where a delayed-release acid becomes activated or liberated. Unsupported flow channels can collapse upon fracture closure, thereby limiting production.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
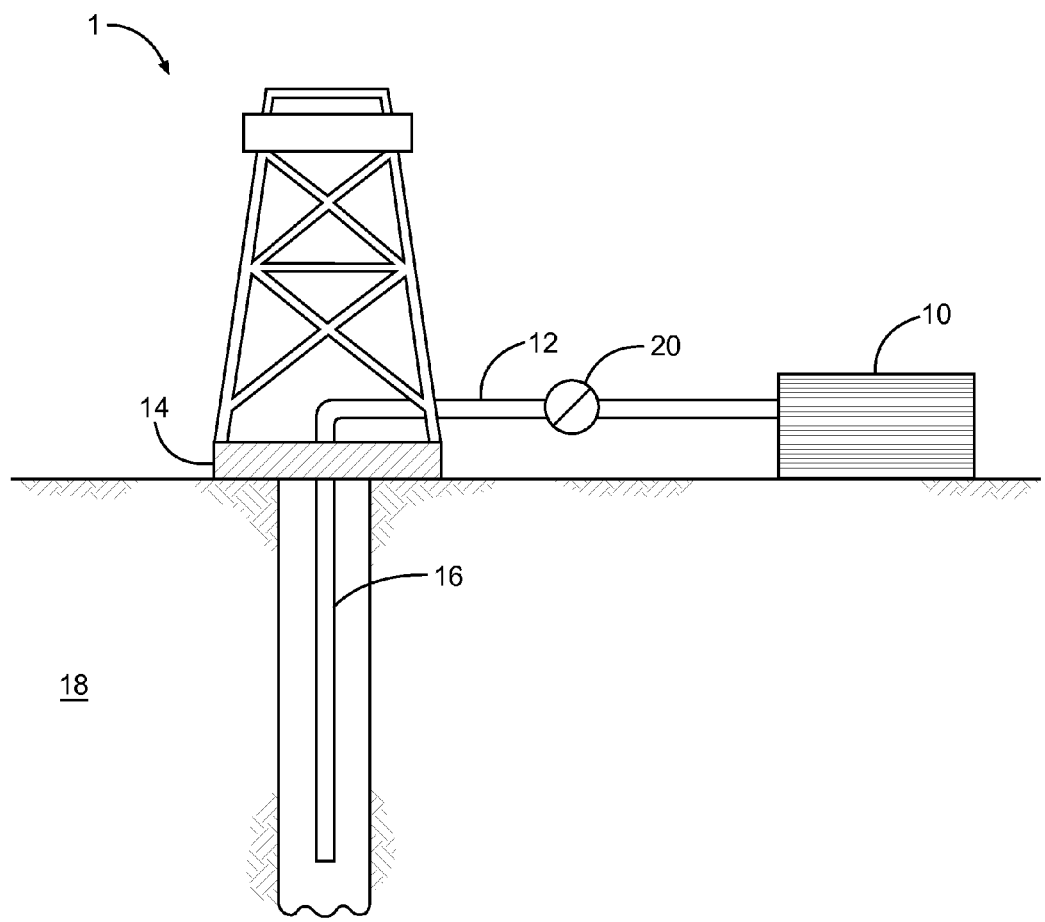
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to R—$NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having n, molecules of molecular weight $M_i$ through the formula $M_n=\Sigma M_i n_i/\Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i/\Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of acidizing a subterranean formation including placing an acid-resisting treatment composition in a subterranean formation. The acid-resisting treatment composition includes a surface modification agent. The placing of the acid-resisting treatment composition in the subterranean formation is such that part of the subterranean formation includes an at least partially acid-resistant coating including the acid-resisting treatment composition or a reaction product thereof. The method also includes placing an acidizing composition in the subterranean formation such that the acidizing composition at least one of etches and dissolves a part of the subterranean formation substantially free of the acid-resistant coating.

In various embodiments, the present invention provides a method of acidizing a subterranean formation including placing an acid-resisting treatment composition in a subterranean formation sufficiently to form at least one fracture, such that part of the fracture includes an at least partially acid-resistant coating including the acid-resisting treatment composition or a reaction product thereof. The acid-resisting treatment composition includes a surface modification agent including a tackifier, a resin, or a combination thereof. The method also includes placing an acidizing composition in the subterranean formation, wherein the acidizing composition at least one of etches and dissolves a part of the fracture substantially free of the acid-resistant coating. The etched or dissolved part of the fracture forms a flowpath. In some embodiments, the acidizing composition includes at least one of a delayed-release acid, an extended-release acid, a retarded acid, a gelled acid, an emulsified acid, a foamed acid, and an acid precursor salt.

In various embodiments, the present invention provides a system including a tubular disposed in a subterranean formation. The system also includes a pump configured to pump an acid-resisting treatment composition including a surface modification agent and an acidizing composition into the subterranean formation through the tubular, wherein the acidizing composition at least one of etches and dissolves a part of the subterranean formation substantially free of an acid-resistant coating including the acid-resisting treatment composition or a reaction product thereof.

Various embodiments of the present invention have certain advantages over other methods of acidizing, and systems for performing the same. For example, in some embodiments, the method can generate stronger flow channels and flow paths that have a more effective support structure than can be formed using other methods. In some embodiments, the method can generate higher conductivity than other methods, resulting in enhanced production. In various embodiments, the cost of achieving enhanced production is less than the cost required to achieve the same degree of production increase using other methods. In various embodiments, due to primarily the uncoated portions of the subterranean formation being dissolved or etched, a lower volume of acidizing composition can be used, reducing costs.

In other methods, acid dissolves or etches the first material it encounters, becoming rapidly neutralized before flowing far into the formation, leading to formation of large dissolved pockets with no support structure. In various embodiments, by placing an acid-resistant coating on part of a subterranean fracture, the acid can dissolve predominantly unprotected portions of the first material it encounters, leaving behind a support structure such as pillars or other structures that connect one portion of etched rock to another. In various embodiments, the support structure can give the formed channels and flow paths greater strength and a lower chance of collapsing upon closure of the fracture, thereby resulting in higher conductivity and enhanced production. In various embodiments, by placing an acid-resistant coating on part of a subterranean fracture, the acid can be consumed more gradually, allowing the acid mixture to penetrate further into the formation and create longer more effective flow channels and flow paths, thereby giving higher conductivity and enhanced production. In various embodiments, the acid-resistant coating can be used with a delayed-release acid to more effectively acidify far-field fractures, such as microfractures, creating stronger flow channels and flow paths along a greater range of depths than is possible with a delayed-release acid in the absence of an acid-resistant coating. In various embodiments, the delayed-release acid can be safer to handle than live acid, thereby providing a safer method of acidizing than other methods.

In various embodiments, the method can enlarge the effective width of primary fractures or microfractures by chemically etching or dissolving the fracture faces predominantly in regions not coated by an acid-resistant coating, thereby selectively forming gaps of channels along the fracture faces. In some embodiments, the method can provide an alternative approach to enhancing conductivity of primary fracture and microfractures that does not depend solely on the placement of proppant. In various embodiments, as an alternative or addition to placement of proppant, the method enables the generation of strong well-supported channels and flowpaths in a fracture network to generate enhanced productivity.

Method of Acidizing.

The present invention provides a method of acidizing a subterranean formation. The method can include obtaining or providing an acid-resisting treatment composition including a surface modification agent. The obtaining or providing of the acid-resisting treatment composition can occur at any suitable time and at any suitable location. The obtaining or providing of the acid-resisting treatment composition can occur above the surface. The obtaining or providing of the acid-resisting treatment composition can occur in the subterranean formation (e.g., downhole). The method includes placing the acid-resisting treatment composition in the subterranean formation. The placing of the acid-resisting treatment composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in a fracture. The placing of the acid-resisting treatment composition in the subterranean formation can be any suitable placing and can include any suitable contacting between the subterranean formation and the acid-resisting treatment composition, wherein the surface modification agent contacts the subterranean formation and forms an at least partially acid-resistant coating including the acid-resisting treatment composition or a reaction product thereof on a part of the subterranean formation, such as part of one or more fracture faces that are part of a single fracture or a network of fractures.

The coating generated by the contacting of the acid-resisting treatment composition and the subterranean formation can be any suitable coating that can at least partially resist acid, such that an uncoated area is more rapidly etched or dissolved by an acid than a coated area exposed to the same acid. The coating can be a coating of tacky or hardened material. The coating can be a molecular coating resulting from reaction of hydroxy-groups on the surface of the subterranean formation and the surface modification agent. The coating can include a combination of tacky or hardened material and a hydroxy-group/surface modification agent reaction product. The coating can be a discontinuous coating with any suitable distribution on the surface of the subterranean formation, such as patches or a random coating.

The method can include hydraulic fracturing, such as a method of hydraulic fracturing to generate a fracture or flow pathway. The placing of the acid-resisting treatment composition in the subterranean formation and the hydraulic fracturing can occur at any time with respect to one another; for example, the hydraulic fracturing can occur at least one of before, during, and after the placing. In some embodiments, the placing of the acid-resisting treatment composition in the subterranean formation can be sufficient to fracture the subterranean formation. In some embodiments, the method can be a method of acid fracturing. In some embodiments, the acid-resisting treatment composition can include a proppant; in other embodiments, the acid-resisting treatment composition is free of proppant.

The method can include obtaining or providing an acidizing composition. The obtaining or providing of the acidizing composition can occur at any suitable time and at any suitable location. The obtaining or providing of the acidizing composition can occur above the surface. The obtaining or providing of the acidizing composition can occur in the subterranean formation (e.g., downhole). The method includes placing the acidizing composition in the subterranean formation. The placing of the acidizing composition in the subterranean formation can include contacting the composition and any suitable part of the subterranean formation that has been exposed to the acid-resisting treatment composition. The placing of the acidizing composition in the subterranean formation can include contacting the composition with or placing the composition in one or more fractures that have been treated with the acid-resisting treatment composition. The placing of the acidizing composition in the subterranean formation is sufficient to at least one of etch and dissolve a part of the subterranean formation substantially free of the acid-resistant coating, such as part of one or more fracture faces that are part of a single fracture or a network of fractures. The method can further include allowing the one or more hydraulic fractures to close to form at least one of channels and gaps including the etched or dissolved part of the subterranean formation.

Acid Resisting Treatment Composition.

The method includes placing an acid-resisting treatment composition including a surface modification agent in the subterranean formation, such that the acid-resisting treatment composition forms an at least partially acid-resistant coating including the acid-resisting treatment composition or a reaction product thereof on a part of the subterranean formation. The coating can be at least one of tacky material, hardened material (e.g., cured material), and a reaction product of hydroxy-groups on the surface of the subterranean formation and the surface modification agent. The coating can be a discontinuous coating with any suitable distribution on the surface of the subterranean formation, such as patches or a random coating. In some examples, the acid-resisting treatment composition can be used in a fracturing process as a pre-pad fluid, a pad fluid, or as a slurry fluid.

The surface modification agent can be any one or more suitable agents that can render at least part of the treated surface of the subterranean formation at least partially resistant to acid. The surface modification agent can include at least one of a tackifying agent or resin, a hydroxy-reactive organosilicon compound, and a phosphonate compound. Any suitable proportion of the acid-resisting treatment composition can be the one or more surface modification agents, such as about 0.01 wt % to about 100 wt %, about 5 wt % to about 95 wt %, about 15 wt % to about 50 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9 wt %, or about 99.99 wt % or more.

The surface modification agent can be organic- or oil-soluble, water soluble, or a combination thereof. In some embodiments, the surface modification agent is an aqueous-based surface modification agent, such that the surface modification agent is included in an aqueous medium, such as dissolved in an organic- or oil-internal phase of a water-external emulsion; e.g., the acid-resisting treatment composition can include an emulsion or can be an emulsion.

In some embodiments, the acid-resisting treatment composition can include at least one surfactant. In some embodiments, the surfactant acts as an emulsion stabilizer. Any suitable amount of the acid-resisting treatment composition can be a surfactant, such as about 0.01 wt % to about 20 wt %, about 0.1 wt % to about 10 wt %, or about 0.01 wt % or less, or about 0.1 wt %, 1, 2, 3, 4, 5, 10, 15 wt %, or about 20 wt % or more. In some embodiments, the surfactant is amine-functional, such as an amine ethoxylate or an amine ethoxylated quaternary salt, such as tallow diamine and tallow triamine exthoxylates and quaternary salts. The surfactant can be an ethoxylated $C_{12}$-$C_{22}$ diamine, an ethoxylated $C_{12}$-$C_{22}$ triamine, ethoxylated $C_{12}$-$C_{22}$ tetraamine, ethoxylated $C_{12}$-$C_{22}$ diamine methylchloride quaternary salt, ethoxylated $C_{12}$-$C_{22}$ triamine methylchloride quaternary salt, ethoxylated $C_{12}$-$C_{22}$ tetraamine methylchloride quaternary salt, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine dodecylbenzenesulfonic acid (DDBSA) salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quaternary salt, heptamethylated $C_{12}$-$C_{22}$ diamine quaternary salt, nonamethylated $C_{12}$-$C_{22}$ diamine quaternary salt, and combinations thereof.

In some embodiments the surfactant can have the structure:

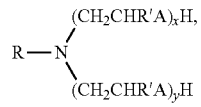

wherein R is a $C_{12}$-$C_{22}$ aliphatic hydrocarbon; R' is independently selected from hydrogen or $C_1$-$C_3$ alkyl group; A is NH or O, and x+y has a value greater than or equal to one but also less than or equal to three. The R group can be a non-cyclic aliphatic. In some embodiments the R group contains at least one degree of unsaturation (e.g., at least one carbon-carbon double bond). In other embodiments the R group can be a commercially recognized mixture of aliphatic hydrocarbons such as soya, which is a mixture of $C_{14}$-$C_{20}$ hydrocarbons, or tallow, which is a mixture of $C_{16}$-$C_{20}$, aliphatic hydrocarbons, or tall oil, which is a mixture of $C_{14}$-$C_{18}$ aliphatic hydrocarbons. In some embodiments, the A group is NH and the value of x+y is two; in some examples, x is one. In some embodiments, the A group is O, the value of x+y is two; in some examples, x is one. Examples of commercially available amine surfactants are TER 2168 Series™ available from Champion Chemicals located in Fresno, Tex.; Ethomeen® T/12, a diethoxylated tallow amine; Ethomeen® S/12, a diethoxylated soya amine; Duomeen® O, a N-oleyl-1,3-diaminopropane, Duomeen® T, an N-tallow-1,3-diaminopropane, all of which are available from Akzo Nobel.

In some embodiments, the surfactant is a tertiary alkyl amine ethoxylate (a cationic surfactant). Triton® RW-100 surfactant (X and Y=10 moles of ethylene oxide) and Triton® RW-150 surfactant (X and Y=15 moles of ethylene oxide) are examples of tertiary alkyl amine ethoxylates that can be purchased from Dow Chemical Company.

In some embodiments, the surfactant is a combination of an amphoteric surfactant and an anionic or cationic surfactant. The one or more amphoteric surfactants can be about 30 wt % to about 45 wt % of the total weight of the surfactants in the acid-resisting treatment composition. The one or more anionic or cationic surfactants can be about 55 wt % to about 70 wt % of the total weight of the surfactants in the acid-resisting treatment composition. The amphoteric surfactant can be lauryl amine oxide, a mixture of lauryl amine oxide and myristyl amine oxide (e.g., a lauryl/myristyl amine oxide), cocoamine oxide, lauryl betaine, oleyl betaine, or combinations thereof. The cationic surfactant can be cocoalkyltriethyl ammonium chloride, hexadecyltrimethyl ammonium chloride, or combinations thereof (e.g., 50:50 mixture by weight of cocoalkyltriethylammonium chloride and the hexadecyltrimethyl ammonium chloride).

In some embodiments, the surfactant is a nonionic surfactant, such as an alcohol oxylalkylate, an alkyl phenol oxylalkylates, a nonionic ester such as a sorbitan esters and an alkoxylates of a sorbitan ester. Examples of nonionic surfactants include castor oil alkoxylates, fatty acid alkoxylates, lauryl alcohol alkoxylates, nonylphenol alkoxylates, octylphenol alkoxylates, tridecyl alcohol alkoxylates, POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitantristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrasteareate ethoxylate, POE-23 lauryl alcohol, POE-20 nonylphenyl ether. Other applicable nonionic surfactants are esters such as sorbitan monooleate.

Surfactants can act as emulsion stabilizers. In some examples, an emulsifying surfactant is ionic to give charge stabilization or has long groups for steric stability in water, such as cationic surfactants and anionic surfactants. Examples of emulsifying surfactants can be hexahydro-1,3,5-tris(2-hydroxyethyl)triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenZene sulfonic acid, branched dodecylbenzene sulfonic acid, fatty acid sulfonate potassium salt, phosphate esters, POE-1 ammonium lauryl ether sulfate, POE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecyl benzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and sodium octyl sulfate.

The acid-resisting treatment composition can include a slickwater fluid (e.g., fluids including friction reducers to increase the speed at which the composition can be pumped downhole), or a viscosified fluid (e.g., a fluid including any one or more viscosifiers, such as any viscosifier described herein), such as about 60 wt % to about 99.99 wt % slickwater or viscosified fluid. The acid-resisting treatment composition can include a carrier fluid, such as any suitable carrier fluid described herein. In some embodiments, about 0.01 wt % to about 99.99 wt % of the acid-resisting treatment composition is the carrier fluid, or about 20 wt % to 95 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

In some embodiments, the acid-resisting treatment composition can include a proppant. In some embodiments, a proppant can be placed in the subterranean formation at least one of before, during, and after placement of the acid-resisting treatment composition in the subterranean formation. A proppant is a material that keeps an induced hydraulic fracture at least partially open during or after a fracturing treatment. For example, in one embodiment, the method includes injecting an acid-resisting treatment composition (e.g., a slickwater fluid) including a surface modification agent and a low concentration of small size propping agent, to function as a pad fluid for creating the primary fractures and microfractures, coating the fracture faces with a tacky film, and placing proppant particulates into these fractures. In some embodiments, the surface modification agent forms a tacky coating on the proppant. In some examples, tackified proppant can bind to at least some of the subterranean formation (e.g., fracture faces) to form at least part of the acid-resistant coating. In some examples, a tacky coating on the subterranean formation can bind to proppant in the acid-resisting treatment composition, which in some embodiments can form a thin layer of proppant on the face of the subterranean formation such as a proppant monolayer. Binding proppant to tackified surfaces in the subterranean formation can help to increase the distribution of proppant in the subterranean formation, such as the distribution of the proppant in a fracture network. In some embodiments, the method includes forming proppant pillars that include the aggregates or clusters of the proppant and the surface modification agent. In some embodiments of the acid-resisting treatment composition that include proppant, any suitable amount of the acid-resisting treatment composition can be proppant, such as about 0.01 wt % to about 40 wt %, or about 1 wt % to about 25 wt %, or about 0.01 wt % or less, or about 0.1, 1, 2, 3, 4, 5, 10, 15, 20, 25, 30, 35, or about 40 wt % or more. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The acid-resisting treatment can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Tackifying Agent.

The surface modification agent can include one or more tackifying agents. The tackifying agent can be any suitable tackifying agent, such as at least one of a polyamide, a polyester, a polycarbonate, a polycarbamate, a natural resin, and a combination thereof. The tackifying agent can be a non-aqueous tackifying agent (e.g., an oil- or organic-soluble tackifying agent)

An example of a tackifying agent includes polyamides that are liquids or in solution at the temperature of the subterranean formation such that they are, by themselves, non-hardening when introduced into the subterranean formation. An example of a tackifying agent includes a condensation reaction product of polyacids and a polyamine, such as mixtures of $C_1$-$C_{40}$ (e.g., $C_{30}$-$C_{40}$, such as $C_{36}$) dibasic acids (optionally containing some trimer and higher oligomers or small amounts of monomer acids) that are reacted with polyamines. Other polyacids include trimer acids, synthetic acids produced from fatty acids, maleic anhydride, acrylic acid, and the like. Additional compounds which can be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000.

Non-aqueous tackifying agents can be used such that they form a non-hardening coating or they can be combined with another component (e.g., a hardening component) capable of reacting with the non-aqueous tackifying agent to form a hardened coating. A "hardened coating" as used herein means that the reaction of the tackifying compound with the hardening component results in a substantially non-flowable reaction product that exhibits a higher compressive strength than the unhardened tackifying compound alone. In this instance, the non-aqueous tackifying agent can function similarly to a hardenable resin.

Hardening components can include aldehydes, dialdehydes such as glutaraldehyde, hemiacetals or aldehyde-releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds, and combinations thereof. Examples of silyl-modified polyamide compounds can include those that are substantially self-hardening and capable of at least partially adhering to subterranean formations and particulates in the unhardened state, and that are further capable of self-hardening themselves to a substantially non-tacky state. Such silyl-modified polyamides can be based, for example, on the reaction product of a silylating compound with a polyamide or a mixture of polyamides. The polyamide or mixture of polyamides can be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the hardening component can be mixed with the tackifying agent in an amount of from about 0.01 wt % to about 50 wt % of the tackifying agent to effect formation of the reaction product. In other embodiments, the hardening compound is present in an amount of from about 0.5 wt % to about 1 wt % by weight of the tackifying agent. Examples of suitable hardening compounds are described in U.S. Pat. No. 5,839,510.
Resin.

The surface modification agent can include one or more resins. The term "resin" as used herein refers to any of numerous physically similar polymerized synthetics or chemically modified natural resins including thermoplastic materials and thermosetting materials. Suitable resins can include all resins known and used in the art. In various embodiments, the resin can include at least one of a natural resin, an epoxy-based resin, a furan-based resin, a phenolic-based resin, a urea-aldehyde resin, a phenol/phenol formaldehyde/furfuryl alcohol resin, bisphenol A diglycidyl ether resin, butoxymethyl butyl glycidyl ether resin, bisphenol A-epichlorohydrin resin, bisphenol F resin, and a mixture of a liquid hardenable resin component and a liquid hardening agent component.

One example of a resin is a two-component epoxy-based resin including a liquid hardenable resin component and a liquid hardening agent component. The liquid hardenable resin component can include a hardenable resin and an optional solvent. The solvent can be added to the resin to reduce its viscosity for ease of handling, mixing and transferring. Viscosity of the hardenable resin can be decreased via heating, which can avoid or decrease the use of a solvent for decreasing viscosity. The liquid hardening agent component can include at least one of a hardening agent and can optionally include at least one of a silane coupling agent, a surfactant, a hydrolyzable ester breaker, and liquid carrier and a carrier fluid for, among other things, reducing the viscosity of the hardening agent component.

Examples of hardenable resins can include organic resins such as at least one of bisphenol A diglycidyl ether resin, butoxymethyl butyl glycidyl ether resin, bisphenol A-epichlorohydrin resin, bisphenol F resin, polyepoxide resin, novolak resin, polyester resin, phenol-aldehyde resin, urea aldehyde resin, furan resin, urethane resin, and a glycidyl ether resin. The hardenable resin can be about 5 wt % to about 100 wt % of the liquid hardenable resin component, or about 25 wt % to about 55 wt %.

The amount of solvent or carrier fluid added to the liquid hardenable resin component or the liquid hardening agent component can be help to achieve a viscosity suitable to the subterranean conditions, and can be affected by the geographic location of the well, the surrounding weather conditions, and the desired long-term stability of a surface modification agent emulsion. The solvent can be, for example, about 0.1 wt % to about 80 wt % of the liquid hardenable resin component or the liquid hardening agent component, or about 0.1 wt % to about 30 wt %. Suitable solvents can include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, fatty acid methyl esters, and combinations thereof. The solvent can be an aqueous-miscble solvent such as methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$-$C_6$ dihydric alkanol containing at least one $C_1$-$C_6$ alkyl group, monoethers of dihydric alkanols, methoxypropanol, butoxyethanol, hexoxyethanol, and isomers thereof.

Examples of the hardening agents can include at least one of piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinaZoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, and 1,1,3-trichlorotrifluoroacetone. The chosen hardening agent can affect the range of temperatures over which a hardenable resin can cure efficiently. In subterranean formations having a temperature from about 60° F. to about 250° F., examples of effective amine and cyclo-aliphatic amine hardening agents include piperidine, triethylamine, N,N-dimethylaminopyridine, benzyldimethylamine, tris(dimethylaminomethyl)phenol, and 2-($N_2$N-dimethylaminomethyl)phenol. In subterranean formations having higher temperatures, examples of effective hardening agents can include 4,4'-diaminodiphenyl sulfone. In some examples, hardening agents that include piperazine or a derivative of piperazine can be effective hardening agents from about 70° F. to about 350° F. The hardening agent used can be included in the liquid hardening agent component in an amount sufficient to consolidate the coated particulates. In some embodiments, the hardening agent component can be about 5 wt % to about 95 wt % of the liquid hardening agent component, about 15 wt % to about 85 wt %, or about 15 wt % to about 55 wt %.

The silane coupling agent can be used to act as a mediator to help bond the resin to at least one of the subterranean formation and proppant. Examples of suitable silane coupling agents can include at least one of N-[3-(aminoethyl)-γ-aminopropyl trimethoxysilane, N-2-(aminoethyl)-3-aminopropyltrimethoxysilane, and 3-glycidoxypropyltrimethoxysilane. The silane coupling agent used can be included in the liquid hardening agent component in an amount capable of sufficiently bonding the resin to at least one of the subterranean formation and the proppant. In some embodiments, when present, the silane coupling agent is about 0.01 wt % to about 20 wt % of the liquid hardening agent component, or about 0.1 wt % to about 3 wt %.

Any surfactant compatible with the hardening agent and capable of facilitating the coating of the resin onto at least one of the subterranean formation and proppants can be used in the liquid hardening agent component. Examples of surfactants can include any surfactant described herein, such as an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also can be suitable. Examples of such surfactant mixtures are described in U.S. Pat. No. 6,311,773. The surfactant or surfactants that can be included in the liquid hardening agent component, when present, can about 0.1 wt % to about 30 wt % of the liquid hardening agent component, or about 1 wt % to about 10 wt %.

Examples of hydrolyzable esters that can be used in the liquid hardening agent component can include at least one of dimethylglutarate, dimethyladipate, dimethylsuccinate, dimethylthiolate, methyl salicylate, dimethyl salicylate, dimethylsuccinate, and t-butylhydroperoxide. When used, a hydrolyzable ester can be about 0.01 wt % to about 10 wt % of the liquid hardening agent, about 0.1 wt % to about 3 wt %, or about 1 wt % to about 2.5 wt %.

In some embodiments, the resin can be a furan-based resin. Suitable furan-based resins can include at least one of furfuryl alcohol resins, mixtures of furfuryl alcohol resins and aldehydes, and a mixture of furan resins and phenolic resins. A furan-based resin can be combined with a carrier fluid such as a solvent to control viscosity if desired. Suitable solvents can include any solvent described herein, such as 2-butoxy ethanol, butyl lactate, butyl acetate, tetrahydrofurfuryl methacrylate, tetrahydrofurfuryl acrylate, esters of oxalic, maleic and succinic acids, and furfuryl acetate.

In some embodiments, the resin can be a phenolic-based resin. Suitable phenolic-based resins can include a terpolymer of phenol, a phenolic formaldehyde resin, and a mixture of phenolic and furan resins. A phenolic-based resin can be combined with a suitable carrier fluid such as a solvent to control viscosity if desired, such as any solvent described herein, such as butyl acetate, butyl lactate, furfuryl acetate, and 2-butoxy ethanol.

In some embodiments, the resin can be phenol/phenol formaldehyde/furfuryl alcohol resin including about 5 wt % to about 30 wt % phenol, about 40 wt % to about 70 wt % phenol formaldehyde, about 10 wt % to about 40 wt % furfuryl alcohol, about 0.1 wt % to about 3 wt % of a silane coupling agent, and about 1 wt % to about 15 wt % of a surfactant. Suitable coupling agents for combining with phenol/phenol formaldehyde/furfuryl alcohol resins can include N-2-(aminoethyl)-3-aminopropyltrimethoxysilane, 3-glycidoxypropyltrimethoxysilane, and n-β-(aminoethyl)-γ-aminopropyltrimethoxysilane. Suitable surfactants can include, but are not limited to, an ethoxylated nonyl phenol phosphate ester, mixtures of one or more cationic surfactants, and one or more non-ionic surfactants and an alkyl phosphonate surfactant.

Hydroxy-Reactive Organosilicon Compound or Phosphonate Compound.

The surface modification agent can include one or more hydroxy-reactive organosilicon compounds or phosphonate compounds. The hydroxy-reactive organosilicon compound can be at least one of a silane and a siloxane (e.g., a monosiloxane or a polysiloxane). The silane or siloxane can include at least one of an alkoxyfunctional silane or siloxane, an alkoxyfunctional siloxane or siloxane, an aminofunctional silane or siloxane, an ureidofunctional silane or siloxane, an epoxyfunctional silane or siloxane, an organohalogen silane or siloxane, an organosilane or organosiloxane ester, a silyl acetamide, a cyclosiloxane, a cyclosilazane, and a silazane.

The organosilicon compound includes one or more groups that can react with hydroxy-groups on the surface of the subterranean formation to make the reacted areas of the subterranean formation less sensitive to acid dissolution or etching. Examples of suitable organofunctional silanes include alkoxyfunctional silanes or siloxanes (e.g., $C_1$-$C_{10}$ alkoxy, or $C_1$-$C_5$ alkoxy), aminofunctional silanes or siloxanes, ureidofunctional silanes or siloxanes, and epoxyfunctional silanes or siloxanes.

Examples of suitable aminofunctional silanes can gamma-aminopropyltriethoxysilane, N-beta-aminoethyl-gamma-aminopropyltrimethoxysilane, and aminoethyl-N-beta-(aminoethyl)-gamma-aminopropyltrimethoxysilane, aminopropyltrimethoxysilane, aminopropyltriethoxysilane, aminopropylmethyldiethoxysilane, a hydrolyzate of aminopropylmethyldiethoxysilane, m-aminophenyltrimethoxysilane, phenylaminopropyltrimethoxysilane, 1-1-2-4-tetramethyl-1-sila-2-azacyclopentane, aminoethylaminopropyltrimethoxysilane, aminoethylaminopropyltrimethoxysilane, aminoethylaminopropyltriethoxysilane, aminoethylaminopropylmethyldimethoxysilane, aminoethylaminoisobutylmethyldimethoxysilane, an aminoethylaminoisobutylmethyldimethoxysilane hydrolyzate, trimethoxysilylpropyldiethylenetriamine, vinylbenzylethylenediaminepropyltrimethoxysilane monohydrochloride, vinylbenzylethylenediaminepropyltrimethoxysilane, benzylethylenediaminepropyltrimethoxysilane monohydrochloride, benzylethylenediaminepropyltrimethoxysilane, allylethylenediaminepropyltrimethoxysilane monohydrochloride, benzylethylenediaminepropyltrimethoxysilane, (triethyoxysilylpropyl)urea. An example of a suitable ureidofunctional silane is gamma-ureidopropyl-triethoxysilane.

Examples of suitable epoxyfunctional silanes include beta-(3-4-epoxy-cyclohexyl)ethyltrimethoxysilane and gamma-glycidoxypropyltrimethoxysilane. Other examples of epoxyfuncational silanes can include glycidoxypropyltrimethoxysilane, glycidoxypropyltriethoxysilane, glycidoxypropylmethyldimethoxysilane, glycidoxypropylmethyldiethoxysilane, epoxycyclohexylethyltrimethoxysilane, and epoxysilane-modified melamine.

Other examples of hydroxy-reaction organosilicon compounds can include organohalogen silanes or siloxanes, organosilane or organosiloxane esters, silyl acetamides, cyclosiloxanes, cyclosilazanes, and silazanes. In one example, the organosilicon compound has the formula $(R^1)_n$—Si—$(R^2)_{4-n}$, wherein each $R^1$ is independently a hydrocarbon including alkyl, cycloalkyl, alkenyl, cycloalkenyl and aryl radicals or combinations thereof containing up to about 18 carbons atoms; each $R^2$ is independently a halogen radical, —$OR^3$ or —OH; each $R^3$ is independently a hydrocarbon including alkyl radicals, aryl radicals, or combinations thereof containing up to about 10 carbon atoms; and n is an integer equal to about 1 to about 3. Specific examples include trihexylchlorosilane, triphenylchlorosilane, trimethylchlorosilane, dimethyldichlorosilane, phenyltrichlorosilane, methylvinyl dichlorosilane, octadecyltrichlorosilane, triethylbromosilane, triethylfluorosilane, vinyl triethoxysilane, amyltriethoxysilane, dimethyldiethoxysilane, phenyltriethoxysilane, methylphenyldimethoxysilane, trimethylethoxysilane, 7-octenyltrimethoxysilane, octadecyltriedthoxysilane, bis-(cycloheptenyl)methyldichlorosilane, bis-(cycloheptenyl)triethoxysilane, benzyltriethoxysilane, and diphenylsilanediol.

In some examples, the organosilicon compound has the formula $(R^4)_m Si(R^6)_p(R^5)_q$, wherein each of $R^6$ and $R^5$ are bound to the Si-atom, wherein $R^4$ is independently equal to $R^1$, and each $R^5$ is independently a halogen radical; each $R^6$ is independently chosen from —$N_3$, —NH—Si—$(R_4)_3$, or —N($CH_3$)—Si—$(R_4)_3$; m is an integer that is about 2 to about 3; q is an integer that is about 0 to 1; p is an integer that is about 1 to about 2; and m+q+p=4. Specific examples include hexamethyldisilazane, azidotrimethylsilane, methylphenyldiazidosilane, hexaphenyldisilazane, heptamethyldisilazane, dimethyldiaziododisilane, triphenylsilazide, and diphenyldiazidosilane.

In some embodiments, the organosilicon compound can have the structure:

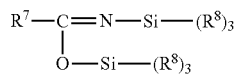

wherein $R^7$ is independently equal to $R^1$ or $R^5$; and each $R^8$ is independently equal to $R^3$ or a hydrogen radical with at least one $R^8$ equal to $R^3$. Specific examples include bis-(trimethylsilyl)acetamide, bis-(dimethylsilyl)acetamide, and N-methyl-N-trimethylsilylacetamide.

In some embodiments, the organosilicon compound can have the structure:

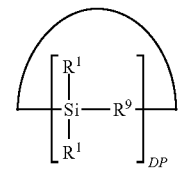

wherein $R^9$ is —O— or —NH—, and DP is an integer that is about 3 to about 20, or about 3 to about 5. Examples include octamethylcyclotetrasiloxane and octamethylcyclotetrasilazane, hexamethylcyclotrisilazane, hexamethylcyclotrisiloxane, 2,2-dimethyltetraphenylcyclotrisiloxane, hexaphenylcyclotrisiloxane, and octaphenylcyclotetrasiloxane.

In some embodiments, the organosilicon compound can be methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, divinyldimethoxysilane, divinyldi-β-methoxyethoxy silane, di(γ-glycidoxypropyl)dimethoxysilane, vinyltriethoxysilane, vinyltris-βmethoxyethoxysilane, γ-glycidoxypropyltrimethoxysilane, γ-methacryloxypropyltrimethoxysilane, β-(3,4-epoxycyclohexyl)ethyltrimethoxysilane, N-β-aminoethyl-γ-propylmethyldimethoxysilane, N-γ-aminoethyl-γ-propyltrimethoxysilane, N-γ-aminoethyl-γ-aminopropyltrimethoxysilane, γ-aminopropyltriethoxysilane, or N-(β-aminoethyl)-γ-amino-propyltrimethoxysilane.

The surface modification agent can include a hydroxy-reactive phosphonate compound. The phosphonate compound can be in solid or liquid form. In some examples, the phosphonate compound can include phosphonic acids and the salts and esters of phosphonic acids. The phosphonate compound can have the structure:

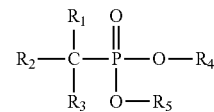

wherein $R^1$, $R^2$, and $R^3$ are each selected from one of a hydrogen, alkyl, aryl, phosphonate, phosphate, acyl, amine, hydroxy or carboxyl group, and wherein $R^4$ and $R^5$ are selected from one of hydrogen, sodium, potassium, ammonium or an organic radical. Specific examples of suitable phosphonate compounds can include at least one of aminotri (methylene phosphonic acid) and its pentasodium salt, 1-hydroxyethylidene-1,1-diphosphonic acid and its tetrasodium salt, hexamethylenediaminetetra(methylene phosphonic acid) and its hexapotassium salt, and diethylenetriaminepenta (methylene phosphonic acid) and its hexasodium salt.

Acidizing Composition.

The method includes placing an acidizing composition in the subterranean formation. The placing of the acidizing composition in the subterranean formation is sufficient to at least one of etch and dissolve a part of the subterranean formation substantially free of the acid-resistant coating, such as part of one or more fracture faces that are part of a single fracture or a network of fractures. The acidizing composition can include at least one of an organic acid, an inorganic acid, a mineral acid, a chelating agent, a delayed-release acid, an extended-release acid, a retarded acid, a gelled acid, an emulsified acid, a foamed acid, an acid precursor salt, and a viscoelastic acid surfactant, wherein the one or the combination of these materials can be any suitable proportion of the acidizing composition, such as about 1 wt % to about 99 wt %, or about 5 wt % to about 80 wt %, or about 1 wt % or less, 2 wt %, 3, 4, 5, 10, 15, 20, 25, 30, 35, 40, 45, 50, 55, 60, 65, 70, 75, 80, 85, 90, 95, 96, 97, 98 wt %, or about 99 wt % or more.

The organic acid, inorganic acid, or mineral acid is chosen from at least one of hydrochloric acid, sulfuric acid, fluoric acid, nitric acid, phosphoric acid, boric acid, hydrobromic acid, perchloric acid, acetic acid, formic acid, lactic acid, citric acid, oxalic acid, uric acid, glutaric acid, glutamic acid, glycolic acid, malonic acid, tartaric acid, adipic acid, sulfamic acid, chloro acetic acid, phthalic acid, a monoaminopolycarboxylic acid, a polyaminopolycarboxylic acid, a salt thereof, an ester thereof (e.g., a ($C_1$-$C_{20}$)hydrocarbyl ester thereof), and mixtures thereof.

Examples of delayed-release acid, extended release acid, or retarded acid can include viscous acid systems, gelled acid systems, chemically retarded acid systems, acid emulsions, encapsulated acids, materials hydrolyzable to generate organic acids, acid precursor salts, and organic acid systems. Viscous acids include emulsified acids and acids gelled with guar or other viscosifying polymers. An emulsified acid can be formed by mixing with kerosene or other suitable oil to form either an acid external phase emulsion or an acid internal phase emulsion. The retardation provided by emulsified acids is primarily a result of the high emulsion viscosity, which reduces the rate of mass transfer to the fracture wall. Shielding by the oil layer may also provide a measure of reduction in the reaction rate. When viscous acids are used, large volumes of fluid can be used to assure adequate fracture conductivity. Gelled acids can be prepared by adding viscosifying polymers such as guar, gum karaya, or polyacrylamide to the acid. The resulting viscous acid can have a retarded acid effect while the fluid is viscous. Oil-wetting surfactants can chemically retard various acids. Various organic acids such as acetic acid and formic acid can be used as retarded acid systems, having a lower reaction rate than strong mineral acids such as hydrochloric acid.

An acid precursor salt can be any salt that can form an acid, such as a mineral acid, such as HCl or HF. In some embodiments, the acid precursor salt can be a hydrofluoride precursor salt chosen from a fluoride or bifluoride salt (e.g., hydrogen difluoride salt) of a substituted or unsubstituted ($C_1$-$C_{50}$) hydrocarbyl having at least one amine or amide functional group thereon (e.g., in reaction product of an amine and HF), an inorganic fluoride (e.g., potassium fluoride) or bifluoride salt (e.g., sodium bifluoride or potassium bifluoride), a tetra(($C_1$-$C_{10}$)hydrocarbyl)ammonium fluoride, ammonium fluoride, ammonium bifluoride, an alkali or ammonium tetrafluoroborate salt, an alkali or ammonium hexafluorophosphate salt, and polyvinylpyridinium fluoride. In some embodiments, the acid precursor salt can be a hydrochloride precursor salt, such as an amide hydrochloride salt, such as a hydrochloride salt of a substituted or unsubstituted ($C_1$-$C_{50}$)hydrocarbyl having at least one amide functional group thereon, formamide hydrochloride, di($C_1$-$C_{10}$)hydrocarbylformamide hydrochloride, dimethylformamide hydrochloride, acetamide hydrochloride, di($C_1$-$C_{10}$)hydrocarbylacetamide hydrochloride, dimethylacetamide hydrochloride, carbamimidoylurea hydrochloride, urea hydrochloride, imidourea hydrochloride (e.g., guanidine hydrochloride), and combinations thereof. In cases where a hydrocarbyl groups are part of the structure of the amide hydrochloride, each hydrocarbyl is independently selected. In some embodiments, the amide hydrochloride salt is urea hydrochloride.

Certain dimers or polymers of organic acids can hydrolyze to form the organic acids, thus releasing the organic acid upon hydrolysis. Examples of materials that can be hydrolyzed to form acids can include lactide, glycolide, polylactic acid, polyglycolic acid, copolymers of poly lactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

In some embodiments, a material hydrolyzable to form an acid, such as a solid form of the material, can be combined with an acid-reactive material, such that the combined solid rapidly degrades upon the initiation of acid generation to allow rapid hydrolysis of the hydrolyzable material to form the acid. Acid-reactive materials that can be useful for increasing the rate of dissolution and hydrolysis of a solid acid-precursor can include magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass.

In some embodiments, the acid can be encapsulated by an encapsulating agent to produce a delayed- or extended release effect. The encapsulated acid can be a solid acid, a solid material hydrolyzable to create acid, or a liquid acid in a gelled state via use of gelling agents. The encapsulating agent can provide temporary encapsulation that can subsequently release the encapsulated material under predetermined conditions, such as including temperature, pH, pressure or other conditions that deteriorate, dissolve, degrade, penetrate, break, or otherwise remove the encapsulating material. The encapsulant can be any suitable encapsulant, such as natural and synthetic oils, natural and synthetic polymers and enteric polymers (e.g., acrylic resin polymers, cellulose acetate phthalate, carboxylated polymers, and the Eudragit® polymer series which are a proprietary aqueous methacrylic polymers available from Rohm, and mixtures thereof), soft plastic, wax, natural or synthetic rubber, latex, vermiculite, polyacrylamide, phenol formaldehyde polymer, nylon, starch, benzoic acid metals, naphthalene, natural or synthetic polymers (e.g., polyvinylchloride or nylon), natural or synthetic oil, and combinations thereof. In various embodiments, the acidizing composition is free of encapsulated acids or acid-sources.

In various embodiments, a delayed-release acid or extended-release acid is chosen from at least one of a sulfonated ester, a phosphate ester, an organo orthoformate, an organo orthoacetate, methyl trichloroacetate, and triethyl citrate. In one embodiment, the organic and inorganic acids, such as sulfonated ester, phosphate ester, organo orthoformate, organo orthoacetate, methyl trichloroacetate, or triethyl citrate, are delay-released once placed in the fractures or microfractures. For example, a suitable amount of slow released acid, such as sulfonate ester, is provided as a first acid component, and a suitable amount of a combined fluoride salt and chloride salt is provided as a second acid component, such that the mixing of the first and second components will generate both HCl and HF acid in the fractures and microfractures.

In various embodiments, the acidizing composition includes a viscosifier, such as any suitable viscosifier described herein. In some examples, the viscosifier is a polysaccharide viscosifier, a polyalkene viscosifier, or a viscoelastic surfactant. A viscoelastic surfactant can be useful in diverting the acidizing composition. The viscoelastic surfactant can cause the acidizing composition to gel (e.g., increase in viscosity) after the acid has become spent and the pH increases, thus temporarily reducing the injectivity of subsequently injected fluids into a zone after stimulating it. In various embodiments, the viscosity change during acid spending is in the range of about 5 cP to about 300 cP (at about 170 s$^{-1}$), depending on the temperature. Thus, as injected, an acidizing composition including a viscoelastic surfactant can have low viscosity, entering and reacting with the first uncoated reactive matrix material encountered. However, after reacting, the acidizing composition including the viscoelastic surfactant can gel and plug up a region of the formation, inducing subsequently injected fluid to enter a new region of the rock matrix; thus, the acidizing composition can be self-diverting. This can enable subsequently-injected acid or reactive fluids to further stimulate other oil or gas zones. After the treatment the diverting gel can be destroyed by flowback fluids or by an internal breaker.

Examples of viscoelastic surfactants can include those found in U.S. Pat. Nos. 6,482,866, 6,435,277, and U.S. Patent Application Publication No. 2002/0023752. Viscoelastic surfactants can be optionally combined with co-surfactants, salts, low-molecular weight alcohols (e.g., methanol), and other additives to enhance viscosity and stability. In one example, a viscoelastic surfactant can have the following structure:

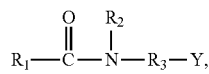

wherein $R^1$ is a $(C_{14}-C_{26})$hydrocarbyl group that may be branched or straight chained, aromatic, aliphatic or olefinic and can contain an amine; $R^2$ is hydrogen or an $(C_1-C_4)$alkyl group; $R^3$ is a $(C_1-C_5)$hydrocarbyl group; and Y is an electron withdrawing group, such as a quaternary amine or an amine oxide. In some embodiments, the viscoelastic surfactant is a betaine having the structure:

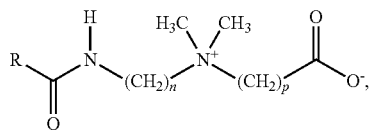

in which R is a $(C_{14}-C_{26})$hydrocarbyl group that may be branched or straight chained, aromatic, aliphatic or olefinic and may contain an amine; n=about 2 to about 4; and p=1 to about 5. In some examples, R is $C_{17}H_{33}$ or $C_{24}H_{41}$, and n=3 and p=1.

In some embodiments, the acidizing composition is viscoelastic and includes an alkyl trialkyl quaternary ammonium aromatic salt and an inorganic monovalent salt. The quaternary ammonium aromatic salt can be a $(C_{10}-C_{24})$alkyl tri$(C_1-C_4)$alkyl quaternary ammonium $(C_4-C_{20})$ aryl salt, such as a $(C_{18})$alkyl trimethyl quaternary ammonium phthalate or a $(C_{18})$alkyl trimethyl quaternary ammonium salicylate. Typically, the weight percent of the $(C_{10}-C_{24})$alkyl tri$(C_1-C_4)$alkyl quaternary ammonium $(C_4-C_{20})$ aryl salt in the viscoelastic fluid can be about 0.1 to about 10 wt %, or about 1 wt % to about 4 wt %. The acidizing composition can include about 1 wt % to 50 wt % of organic acid, or about 5 wt % to about 10 wt % of the organic acid. The acidizing composition can also include an inorganic salt, such as a monovalent salt, and water, wherein the acidizing composition can include about 1 wt % to about 20 wt % of the inorganic salt, or about 3 wt % to about 10 wt %. The presence of the inorganic monovalent salt can increase the ionic strength of the fluid and thereby allow gelation of the organic acid when the quaternary ammonium aromatic salt is added or when the acid is spent. Suitable monovalent salts can include potassium chloride, ammonium chloride, sodium chloride and mixtures thereof.

The acidizing composition can include a chelating agent. Chelating agents can be included, for example, to prevent undesired precipitation of various materials with metal ions resulting from the reaction of the acid and the subterranean formation. In some embodiments, 0.01 wt % to about 50 wt % of the acidizing composition can be chelating agent, or about 10 wt % to about 40 wt %. The chelating agent is chosen from at least one of malic acid, tartaric acid, citric acid, aminopolycarboxylate and polyaminopolycarboxylate chelating agents (such as, nitrilotriacetic acid (NTA), hydroxyethlimnodiacetic acid (HEIDA), hydroxyethylethylenediaminetetraacetic acid (HEDTA), ethylenediaminetetraacetic acid (EDTA), cyclohexylenediaminetetraacetic acid (CyDTA), diethylenetriaminepentaacetic acid (DTPA), aminopolymethylenephosphonic acid chelating agents and the salts thereof, polyaspartic acid, methylglycine diacetic acid (MGDA), iminodisuccinic acid (IDS), hydroxyethyl iminodisuccinic acid (HIDS), and glutamic acid diacetic acid (GLDA).

The acidizing composition can include a carrier fluid. Any suitable amount of the carrier fluid can be present, for example, about 0.01 wt % to about 99 wt % of the acidizing composition can be the carrier fluid, or about 20 to about 95 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, or about 99 wt % or more.

Other Components.

In some embodiments, at least one of the acidizing composition and the acid-resisting treatment composition includes a viscosifier. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition (e.g., the acidizing composition or the acid-resisting treatment composition), about 0.004 wt % to about 0.01 wt % of the composition, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition.

The viscosifier can include at least one of a substituted or unsubstituted polysaccharide, and a substituted or unsubstituted polyalkenylene, wherein the polysaccharide or polyalkenylene is crosslinked or uncrosslinked. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and poly(($C_2$-$C_{10}$)alkenylene), wherein the ($C_2$-$C_{10}$)alkenylene is substituted or unsubstituted. The viscosifier can include at least one of poly(acrylic acid) or ($C_1$-$C_5$) alkyl esters thereof, poly(methacrylic acid) or ($C_1$-$C_5$)alkyl esters thereof, poly(vinyl acetate), poly(vinyl alcohol), poly (ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, at least one of the acid-resisting treatment composition and the acidizing composition can include a crosslinker. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition (e.g., the acid-resisting composition or the acidizing composition), about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, at least one of the acid-resisting treatment composition and the acidizing composition can include any suitable amount of any suitable material used in a downhole fluid, such as water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, at least one of the acid-resisting treatment composition and the acidizing composition can include one or more additive components such as: thinner additives such as COLD-TROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ 0 for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the acid-resisting treatment composition and the acidizing composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

In some embodiments, the acid-resisting treatment composition or the acidizing composition can include a breaker, or another composition placed downhole during the method can include a breaker. In some embodiments, the method can include placing a breaker in the subterranean formation to lower the viscosity of materials downhole, for example, to break-up gels, and to allow the viscous materials to be cleaned out or recovered such that flowpaths are unhindered, such as flowpaths generated in fracture faces. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyperchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the composition (e.g., the acid-resisting composition, the acidizing composition, or another composition), or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

System or Apparatus.

In various embodiments, the present invention provides a system. The system can be any suitable system that can use or that can perform or be generated by performance of a method described herein. In various embodiments, the system can include a tubular disposed in a subterranean formation. The system can also include a pump configured to pump an acid-resisting treatment composition including a surface modification agent or an acidizing composition into the subterranean formation through the tubular. As described herein, the acidizing composition at least one of etches and dissolves a part of the subterranean formation substantially free of an acid-resistant coating including the acid-resisting treatment composition or a reaction product thereof. Throughout this section ("system or apparatus"), "composition" refers to at least one of an acid-resisting treatment composition and an acidizing composition, and can also refer to ancillary compositions placed in the subterranean formation during embodiments of the methods described herein.

The pump can be a high pressure pump in some embodiments. As used herein, the term "high pressure pump" refers to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

EXAMPLES

Various embodiments of the present invention can be better understood by reference to the following Examples which are offered by way of illustration. The present invention is not limited to the Examples given herein.

Example 1. X-Ray Diffraction (XRD) Analysis of Core Samples

A small sample from each Marcellus and Eagle Ford shale core was obtained for XRD analysis. Table 1 provides details of the mineral compositions obtained from these analyses. The high contents of calcite in these shale samples indicate they are potential candidates for etching with acid or chelating agent.

TABLE 1

XRD Results of Marcellus and Eagle Ford shale samples

| Mineral | Formula | Marcellus shale | Eagle Ford shale |
|---|---|---|---|
| Calcite | $CaCO_3$ | 89.6 ± 0.7 | 66.7 ± 0.6 |
| Quartz | $SiO_2$ | 7.7 ± 0.2 | 26.5 ± 0.3 |
| Pyrite | $FeS_2$ | 1.0 ± 0.1 | trace (<1.0) |
| Dolomite | $CaMg(CO_3)_2$ | 1.7 ± 0.2 | trace (<1.0) |
| Dickite | $Al_2Si_2O_5(OH)_4$ | N/A | 4.3 ± 0.5 |
| Gypsum | $CaSO_4 \cdot 2H_2O$ | N/A | 2.5 ± 0.2 |

Example 2. Treatment of Core Sample Fracture Faces with Aqueous-Based Surface Modification Agent (ASMA)

A 5% (v/v) solution of SandWedge® ABC was used as the ASMA solution in this Example. SandWedge® ABC is an aqueous-based emulsion with an aqueous external phase and an internal phase including a surface modification agent. The ASMA solution was prepared in a slickwater fluid containing an organic clay stabilizer.

Figure 2A:
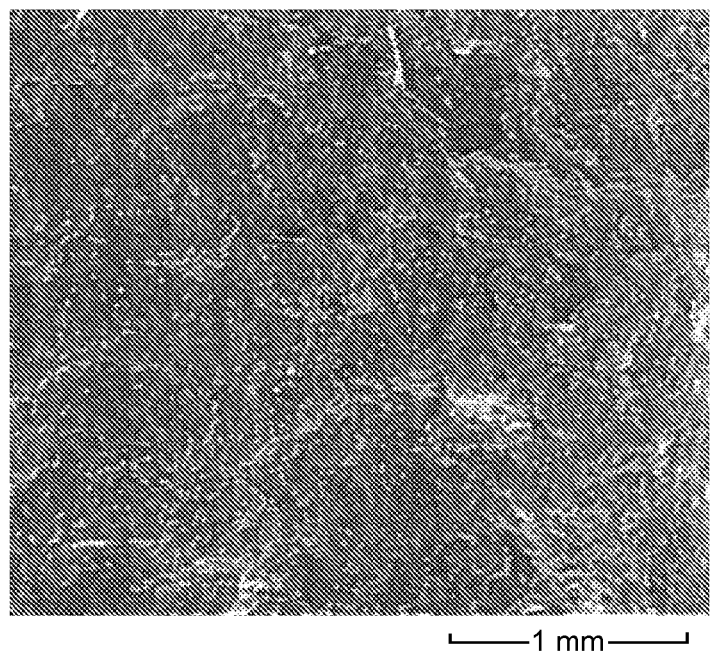
FIG. 2A illustrates an electron microscopy image of the fracture face before immersion in an aqueous-based surface modification agent solution, in accordance with various embodiments.
Figure 2B:
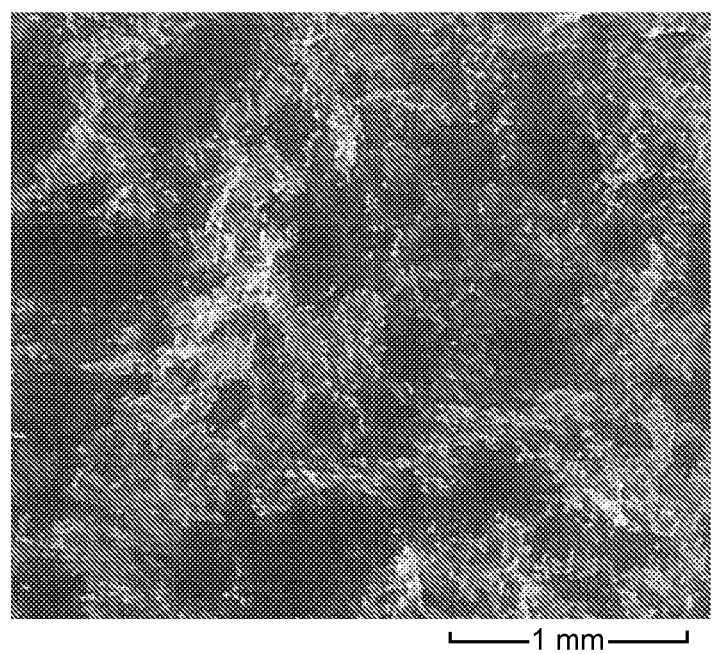
FIG. 2B illustrates an electron microscopy image of the fracture face after immersion in an aqueous-based surface modification agent solution, in accordance with various embodiments.

The shale core sample of Example 1 from Eagle Ford shale was split into two halves along the core length to create artificial fracture faces. The fracture faces of the two halves were immersed vertically in the 5% (v/v) ASMA solution at 140° F. for 10 min. The ASMA solution was stirred with a stirring bar at 700 RPM to ensure the treatment fluid was in motion. After being removed from the ASMA solution, environmental scanning electron microscopy was used to capture the images of split-core surfaces. FIG. 2A illustrates an electron microscopy image of the fracture face before immersion in the ASMA solution. FIG. 2B illustrates an electron microscopy image of the fracture face after immersion in the ASMA solution. The coating by the ASMA was found to form random patches on the fracture face rather than a uniform, coated layer on the substrate surface.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of acidizing a subterranean formation comprising:

placing an acid-resisting treatment composition comprising a surface modification agent in a subterranean formation, such that part of the subterranean formation comprises an at least partially acid-resistant coating comprising the acid-resisting treatment composition or a reaction product thereof; and placing an acidizing composition in the subterranean formation, wherein the acidizing composition at least one of etches and dissolves a part of the subterranean formation substantially free of the acid-resistant coating.

Embodiment 2 provides the method of Embodiment 1, wherein the method is a method of acid fracturing.

Embodiment 3 provides the method of any one of Embodiments 1-2, wherein the part of the subterranean formation comprising the at least partially acid-resistant coating comprises one or more hydraulic fractures.

Embodiment 4 provides the method of Embodiment 3, further comprising allowing the one or more hydraulic fractures to close to form at least one of channels and gaps comprising the etched or dissolved part of the subterranean formation.

Embodiment 5 provides the method of any one of Embodiments 1-4, wherein the coating comprises patches of the acid-resisting treatment composition or the reaction product thereof.

Embodiment 6 provides the method of Embodiment 5, wherein the patches comprise a random distribution over a region of the subterranean formation.

Embodiment 7 provides the method of any one of Embodiments 1-6, wherein the coating comprises a tacky coating.

Embodiment 8 provides the method of any one of Embodiments 1-7, wherein the coating comprises a reaction product of hydroxy-groups on a surface of the subterranean formation and the acid-resisting treatment composition.

Embodiment 9 provides the method of any one of Embodiments 1-8, wherein the acid-resisting treatment composition comprises a carrier fluid.

Embodiment 10 provides the method of Embodiment 9, wherein about 0.01 wt % to about 99.99 wt % of the acid-resisting treatment composition is the carrier fluid.

Embodiment 11 provides the method of any one of Embodiments 9-10, wherein about 20 wt % to 95 wt % of the acid-resisting treatment composition is the carrier fluid.

Embodiment 12 provides the method of any one of Embodiments 1-11, wherein the acid-resisting treatment composition comprises a pad fluid.

Embodiment 13 provides the method of any one of Embodiments 1-12, wherein the acid-resisting treatment composition comprises a slickwater fluid.

Embodiment 14 provides the method of any one of Embodiments 1-13, wherein about 60 wt % to about 99.99 wt % of the acid-resisting treatment composition is at least one of a pad fluid and a slickwater fluid.

Embodiment 15 provides the method of any one of Embodiments 1-14, wherein placing the acid-resisting treatment composition in the subterranean formation comprises fracturing the subterranean formation.

Embodiment 16 provides the method of any one of Embodiments 1-15, wherein at least one of a) the acid-resisting treatment composition comprises a proppant and b) proppant is placed in the subterranean formation at least one of before, during, and after placement of the acid-resisting treatment composition in the subterranean formation.

Embodiment 17 provides the method of Embodiment 16, wherein about 0.01 wt % to about 30 wt % of the acid-resisting treatment composition is the proppant.

Embodiment 18 provides the method of any one of Embodiments 16-17, further comprising forming a tacky coating on the proppant, the tacky coating comprising the surface modification agent.

Embodiment 19 provides the method of any one of Embodiments 16-18, further comprising forming proppant pillars comprising the proppant and the surface modification agent.

Embodiment 20 provides the method of any one of Embodiments 16-19, wherein the proppant binds to at least some of the subterranean formation comprising the coating.

Embodiment 21 provides the method of Embodiment 20, wherein the proppant bound to the coating comprises a proppant monolayer.

Embodiment 22 provides the method of any one of Embodiments 1-21, wherein about 0.01 wt % to about 100 wt % of the acid-resisting treatment composition is the surface modification agent.

Embodiment 23 provides the method of any one of Embodiments 1-22, wherein about 15 wt % to about 50 wt % of the acid-resisting treatment composition is the surface modification agent.

Embodiment 24 provides the method of any one of Embodiments 1-23, wherein the surface modification agent is an aqueous-based surface modification agent.

Embodiment 25 provides the method of any one of Embodiments 1-24, wherein the acid-resisting treatment composition comprises a water-external and at least one of organic- and oil-internal emulsion, wherein at least one of the organic- and oil-internal phase comprises the surface modification agent.

Embodiment 26 provides the method of Embodiment 25, wherein the acid-resisting treatment composition comprises at least one emulsion stabilizer.

Embodiment 27 provides the method of any one of Embodiments 1-26, wherein the acid-resisting treatment composition comprises a surfactant.

Embodiment 28 provides the method of Embodiment 27, wherein about 0.1 wt % to about 10 wt % of the acid-resisting treatment composition is the surfactant.

Embodiment 29 provides the method of any one of Embodiments 27-28, wherein the surfactant is an amine-functional surfactant.

Embodiment 30 provides the method of any one of Embodiments 1-29, wherein the surface modification agent comprises at least one of a tackifying agent or resin, a hydroxy-reactive organosilicon compound, and a phosphonate compound.

Embodiment 31 provides the method of Embodiment 30, wherein the tackifying agent comprises at least one of a polyamide, a polyester, a polycarbonate, a polycarbamate, a natural resin, and a combination thereof.

Embodiment 32 provides the method of any one of Embodiments 30-31, wherein the resin comprises at least one of a natural resin, an epoxy-based resin, a furan-based resin, a phenolic-based resin, a urea-aldehyde resin, a phenol/phenol formaldehyde/furfuryl alcohol resin, bisphenol A diglycidyl ether resin, butoxymethyl butyl glycidyl ether resin, bisphenol A-epichlorohydrin resin, bisphenol F resin, and a mixture of a liquid hardenable resin component and a liquid hardening agent component.

Embodiment 33 provides the method of any one of Embodiments 30-32, wherein the hydroxy-reactive organosilicon compound comprises at least one of a silane and a siloxane.

Embodiment 34 provides the method of Embodiment 33, wherein the silane or siloxane comprises at least one of an alkoxyfunctional silane or siloxane, an alkoxyfunctional siloxane or siloxane, an aminofunctional silane or siloxane, an ureidofunctional silane or siloxane, an epoxyfunctional silane or siloxane, an organohalogen silane or siloxane, an organosilane or organosiloxane ester, a silyl acetamide, a cyclosiloxane, a cyclosilazane, and a silazane.

Embodiment 35 provides the method of any one of Embodiments 30-34, wherein the surface modification agent comprises a non-aqueous tackifying agent or resin, the acid-resisting treatment composition comprises a water-external and at least one of organic- and oil-internal emulsion, wherein at least one of the organic- and oil-internal phase comprises the surface modification agent, and wherein the water-external phase comprises at least one surfactant.

Embodiment 36 provides the method of any one of Embodiments 1-35, wherein the acidizing composition comprises a carrier fluid.

Embodiment 37 provides the method of Embodiment 36, wherein about 0.01 wt % to about 99 wt % of the acidizing composition comprises the carrier fluid.

Embodiment 38 provides the method of any one of Embodiments 36-37, wherein about 20 wt % to 95 wt % of the acidizing composition comprises the carrier fluid.

Embodiment 39 provides the method of any one of Embodiments 1-38, wherein the acidizing composition comprises at least one of an organic acid, an inorganic acid, a mineral acid, a chelating agent, a delayed-release acid, an extended-release acid, a retarded acid, a gelled acid, an emulsified acid, a foamed acid, and an acid precursor salt.

Embodiment 40 provides the method of Embodiment 39, wherein the organic acid, inorganic acid, or mineral acid is chosen from at least one of hydrochloric acid, sulfuric acid, fluoric acid, nitric acid, phosphoric acid, boric acid, hydrobromic acid, perchloric acid, acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof, and mixtures thereof.

Embodiment 41 provides the method of any one of Embodiments 39-40, wherein the delayed-release acid or extended-release acid is chosen from an acid emulsion, an encapsulated acid, and a material hydrolyzable to generate an organic acid.

Embodiment 42 provides the method of any one of Embodiments 39-41, wherein the chelating agent is chosen from at least one of malic acid, tartaric acid, citric acid, aminopolycarboxylate and polyaminopolycarboxylate chelating agents (such as, nitrilotriacetic acid (NTA), hydroxyethlimnodiacetic acid (HEIDA), hydroxyethylethylenediaminetetraacetic acid (HEDTA), ethylenediaminetetraacetic acid (EDTA), cyclohexylenediaminetetraacetic acid (CyDTA), diethylenetriaminepentaacetic acid (DTPA), aminopolymethylenephosphonic acid chelating agents and the salts thereof, polyaspartic acid, methylglycine diacetic acid (MGDA), iminodisuccinic acid (IDS), hydroxyethyl iminodisuccinic acid (HIDS), and glutamic acid diacetic acid (GLDA).

Embodiment 43 provides the method of any one of Embodiments 39-42, wherein the delayed-release acid or extended-release acid is chosen from at least one of a sulfonated ester, a phosphate ester, an organo orthoformate, an organo orthoacetate, methyl trichloroacetate, and triethyl citrate.

Embodiment 44 provides the method of any one of Embodiments 1-43, wherein the acidizing composition comprises a viscosifier.

Embodiment 45 provides the method of Embodiment 44, wherein the viscosifier comprises at least one of a polysaccharide and a viscoelastic surfactant.

Embodiment 46 provides the method of any one of Embodiments 1-45, wherein at least one of the acid-resisting treatment composition and the acidizing composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 47 provides a system for performing the method of any one of Embodiments 1-46, the system comprising:

a tubular disposed in the subterranean formation; and a pump configured to pump the acid-resisting treatment composition and the acidizing composition into the subterranean formation through the tubular.

Embodiment 48 provides a method of acidizing a subterranean formation comprising:

placing an acid-resisting treatment composition comprising a surface modification agent comprising at least one of a tackifier and a resin in a subterranean formation sufficiently to form at least one fracture, such that part of the fracture comprises an at least partially acid-resistant coating comprising the acid-resisting treatment composition or a reaction product thereof; and placing an acidizing composition in the subterranean formation, wherein the acidizing composition at least one of etches and dissolves a part of the fracture substantially free of the acid-resistant coating, such that the etched or dissolved part of the fracture forms a flowpath.

Embodiment 49 provides the method of Embodiment 48, wherein the acidizing composition comprises at least one of a delayed-release acid, an extended-release acid, a retarded acid, a gelled acid, an emulsified acid, a foamed acid, and an acid precursor salt.

Embodiment 50 provides a system comprising:

a tubular disposed in a subterranean formation; and a pump configured to pump an acid-resisting treatment composition comprising a surface modification agent and an acidizing composition into the subterranean formation through the tubular, wherein the acidizing composition at least one of etches and dissolves a part of the subterranean formation substantially free of an acid-resistant coating comprising the acid-resisting treatment composition or a reaction product thereof.

Embodiment 51 provides the composition, method, or system of any one or any combination of Embodiments 1-51 optionally configured such that all elements or options recited are available to use or select from.

What is claimed is:

1. A method of acidizing a subterranean formation, comprising:
pumping an acid-resisting treatment composition comprising a surface modification agent comprising at least one of a tackifying agent or resin, a hydroxy-reactive organosilicon compound, or a phosphonate compound into the subterranean formation, wherein the acid-resisting treatment composition further comprises about 0.001 wt % to about 10 wt % of a viscosifier; then
producing an at least partially acid-resistant coating comprising the surface modification agent or a reaction product thereof on at least a part of the subterranean formation; and then
pumping an acidizing composition into the subterranean formation, wherein the acidizing composition at least one of etches and dissolves another part of the subterranean formation substantially free of the acid-resistant coating.

2. The method of claim 1, wherein the part of the subterranean formation comprising the at least partially acid-resistant coating comprises one or more hydraulic fractures.

3. The method of claim 1, wherein the coating comprises patches of the acid-resisting treatment composition or the reaction product thereof.

4. The method of claim 1, wherein the coating comprises a tacky coating.

5. The method of claim 1, wherein the coating comprises a reaction product of hydroxy-groups on a surface of the subterranean formation and the acid-resisting treatment composition.

6. The method of claim 1, wherein the acid-resisting treatment composition comprises a pad fluid.

7. The method of claim 1, wherein the acid-resisting treatment composition comprises a slickwater fluid.

8. The method of claim 1, wherein about 60 wt % to about 99.99 wt % of the acid-resisting treatment composition is at least one of a pad fluid and a slickwater fluid.

9. The method of claim 1, wherein placing the acid-resisting treatment composition in the subterranean formation comprises fracturing the subterranean formation.

10. The method of claim 1, wherein at least one of a) the acid-resisting treatment composition comprises a proppant and b) proppant is placed in the subterranean formation at least one of before, during, and after placement of the acid-resisting treatment composition in the subterranean formation.

11. The method of claim 1, wherein the surface modification agent is an aqueous-based surface modification agent.

12. The method of claim 1, wherein the acid-resisting treatment composition comprises an emulsion comprising a water-external phase and an organic-internal phase, wherein the organic-internal phase comprises the surface modification agent.

13. The method of claim 1, wherein the acid-resisting treatment composition comprises a surfactant.

14. The method of claim 1, wherein the surface modification agent comprises a non-aqueous tackifying agent or resin, the acid-resisting treatment composition comprises an emulsion comprising a water-external phase and an organic-internal phase, wherein the organic-internal phase comprises the surface modification agent, and wherein the water-external phase comprises a surfactant.

15. The method of claim 1, wherein the acidizing composition comprises a carrier fluid.

16. The method of claim 1, wherein the acidizing composition comprises at least one of an organic acid, an inorganic acid, a mineral acid, a chelating agent, a delayed-release acid, an extended-release acid, a retarded acid, a gelled acid, an emulsified acid, a foamed acid, and an acid precursor salt.

17. The method of claim 1, wherein the viscosifier comprises a poly(vinyl alcohol) homopolymer, poly(vinyl alcohol) copolymer, a crosslinked poly(vinyl alcohol) homopolymer, a crosslinked poly(vinyl alcohol) copolymer, or any combination thereof.

18. A system for performing the method of claim 1, the system comprising:
a tubular disposed in the subterranean formation; and
a pump configured to pump the acid-resisting treatment composition and the acidizing composition into the subterranean formation through the tubular.

19. A method of acidizing a subterranean formation, comprising:
pumping an acid-resisting treatment composition comprising a surface modification agent and about 0.001 wt % to about 10 wt % of a viscosifier in the subterranean formation, wherein the surface modification agent comprises at least one of a tackifier and a resin; then forming at least one fracture in the subterranean formation; then producing an at least partially acid-resistant coating comprising the surface modification agent or a reaction product thereof on at least a part of a surface of the fracture; and then pumping an acidizing composition in the subterranean formation, wherein the acidizing composition at least one of etches and dissolves another part the surface of the fracture substantially free of the acid-resistant coating, such that the etched or dissolved part of the surface of the fracture forms a flowpath.

* * * * *